(12) United States Patent
Aikens

(10) Patent No.: US 7,552,643 B2
(45) Date of Patent: Jun. 30, 2009

(54) DEVICE AND SYSTEM FOR CORROSION DETECTION

(75) Inventor: John Aikens, New Maryland (CA)

(73) Assignee: Centre For Nuclear Energy Research (CNER), Fredericton (CA)

( * ) Notice: Subject to any disclaimer, the term of this patent is extended or adjusted under 35 U.S.C. 154(b) by 0 days.

(21) Appl. No.: 12/000,129

(22) Filed: Dec. 10, 2007

(65) Prior Publication Data

US 2008/0148862 A1   Jun. 26, 2008

Related U.S. Application Data

(60) Provisional application No. 60/873,601, filed on Dec. 8, 2006.

(51) Int. Cl.
*G01M 3/08* (2006.01)
(52) U.S. Cl. .............................. 73/756; 73/198; 73/46
(58) Field of Classification Search .................. 73/46, 73/198, 756
See application file for complete search history.

(56) References Cited

U.S. PATENT DOCUMENTS

| | | | |
|---|---|---|---|
| 3,683,137 | A | 8/1972 | Stiltner |
| 4,019,133 | A | 4/1977 | Manley et al. |
| 4,040,289 | A | 8/1977 | Clark |
| 4,101,828 | A | 7/1978 | Dehler |
| 4,192,175 | A | 3/1980 | Godai et al. |
| 4,477,778 | A | 10/1984 | Lawrence, Jr. et al. |
| 4,583,394 | A | 4/1986 | Murakami et al. |
| 4,752,360 | A * | 6/1988 | Jasinski ............ 205/776.5 |
| 5,297,940 | A | 3/1994 | Buse |

(Continued)

FOREIGN PATENT DOCUMENTS

JP      59170562      9/1984

(Continued)

OTHER PUBLICATIONS

Caproco Internal Corrosion Monitoring Specialists, "Hydrogen Probe Inserts" (undated 2 page product brochure).

(Continued)

*Primary Examiner*—Andre J Allen
(74) *Attorney, Agent, or Firm*—Eugene Derenyi

(57) ABSTRACT

A device for monitoring gas effusing from a pipe, the device comprising a mounting assembly having an upper and lower bracket; a housing located on the upper bracket; the bottom of the housing is of a shape complementary to the pipe being monitored; a probe assembly; a bore in the housing for receiving the probe assembly; the probe assembly comprising: a probe insert; a chamber for collecting gas in the bottom of the probe insert formed by side walls and an upper wall; a compressible sealing means in the bottom of the side walls for sealingly engaging the outer surface of the pipe to be monitored; a passageway in the probe insert, extending from an outlet at the top surface of the probe insert to an inlet in the upper wall of the chamber, such that the passageway is in flow communication with the chamber; a tube receivable through the outlet of the passageway; a plate removably connected to the housing for, securing the probe assembly in place; the plate comprising a biasing means for compressing the sealing means of the probe disk to engage the outer surface of the pipe to be monitored forming a substantially hermetic seal; and the tube when resting at the inlet of the probe disk extends through the plate.

11 Claims, 8 Drawing Sheets

U.S. PATENT DOCUMENTS

| | | | |
|---|---|---|---|
| 5,366,609 A * | 11/1994 | White et al. | 204/403.04 |
| 5,511,573 A | 4/1996 | Corte | |
| 5,594,162 A | 1/1997 | Dolan et al. | |
| 5,854,557 A | 12/1998 | Tiefnig | |
| 6,077,418 A * | 6/2000 | Iseri et al. | 205/775.5 |
| 6,537,824 B1 | 3/2003 | Correa | |
| 6,554,981 B2 | 4/2003 | Lewis, II et al. | |
| 6,814,854 B2 | 11/2004 | Lewis, II et al. | |

FOREIGN PATENT DOCUMENTS

| | | |
|---|---|---|
| JP | 02038843 | 2/1990 |
| JP | 02107947 | 4/1990 |
| JP | 03035138 | 2/1991 |
| WO | WO 01/40782 | 6/2001 |

OTHER PUBLICATIONS

Ion Science Limited, "Prove and improve your corrosion control: Hydrosteel 6000" (undated 4 page product brochure).

Ion Science Limited, "Continuous Active Corrosion Measurement: Hydrosteel 7000" (undated 2 page product brochure).

Rohrback Cosasco Systems, Inc., "Series 6400 Cosasco Hydrogen Probes" (4 pages).

Metal Samples Corrosion Monitoring Systems, "Model HY4000: Hydrogen Probe Retractable with Packing Gland" (undated 2 page product brochure).

Metal Samples Corrosion Monitoring Systems, "Model HY7000: Hydrogen Probe for High Pressure (HP and MH) Access Systems" (undated 2 page product brochure).

"H-FluxT and H-ProbeT: Hydrogen Flux Monitoring Systems for Field, Plant and Laboratory" (undated 2 page product brochure).

Caproco Internal Corrosion Monitoring Specialists, "Hydrogen Monitoring Probes" (undated 2 page product brochure).

Caproco Internal Corrosion Monitoring Specialists, "Hydrogen Monitoring Probe Patch/ Saddle" (undated 2 page product brochure).

M. Krulfeld, M.C. Bloom & R.E. Seebold, "Corrosion Rate Measurement by Hydrogen Effusion in Dynamic Aqueous Systems at Elevated Temperature and Pressure", Corrosion—National Association of Corrosion Engineers, Apr. 1959, pp. 29-32, vol. 15.

M.C. Bloom, "A Survey of Steel Corrosion Mechanisms Pertinent to Steam Power Generation", US Navel Research Laboratory, Washington D.C., pp. 1-12 (undated).

M.C. Bloom & M. Krulfeld, "A Hydrogen Effusion Method for the Determination of Corrosion Rates in Aqueous Systems at Elevated Temperature and Pressure", Journal of the Electrochemical Society, May 1957, pp. 264-269.

Evaluation of the Hydrogen Effusion Probe for the On-Line Monitoring of the Flow-Accelerated Corrosion of Carbon Steel under Simulated Heat Transport System Conditions, Feeder Integrity Joint Program, cover page and pp. 2-4, Aug. 2003, CANDU Owners Group Inc., Toronto, Ontario, Canada.

* cited by examiner

DEVICE AND SYSTEM FOR CORROSION DETECTION

This application claims the benefit of priority from U.S. patent application Ser. No. 60/873,601 filed Dec. 8, 2006.

FIELD OF THE INVENTION

The present invention relates to a device and system for detecting corrosion. In particular, the invention relates to a device and system for detecting corrosion which produces hydrogen as a by-product, such as in pipes containing oil and gas and in pipes experiencing flow-accelerated corrosion.

BACKGROUND OF THE INVENTION

When a carbon steel or low-alloy steel pipe corrodes from flow-accelerated corrosion ("FAC"), hydrogen produced from the corrosion in the pipe diffuses through the pipe wall and escapes from the outside surface of the pipe. FAC in pipes is a specific type of erosion-corrosion resulting in an increased rate of corrosion of carbon or low-alloy steels due to the dissolution of their normally protective oxide layer into water or a water/steam mixture moving through the pipe. There is a known correlation between the rate at which the hydrogen effuses from a pipe and the rate of pipe wall thinning due to corrosion. Hydrogen is also produced in other corrosion reactions such as those involving sulfides in pipes carrying oil and gas. As with FAC, the hydrogen diffuses through the pipe wall and escapes from the outside surface of the pipe.

SUMMARY OF THE INVENTION

According to an embodiment of the present invention there is provided a device for monitoring gas effusing from a pipe, the device comprising: a mounting assembly having an upper and lower bracket; a housing located on the upper bracket; the bottom of the housing is of a shape complementary to the pipe being monitored; a bore in the housing for receiving the probe assembly; the probe assembly comprising: a probe insert; a chamber for collecting gas in the bottom of the probe insert formed by side walls and an upper wall; a compressible sealing means in the bottom of the side walls for sealingly engaging the outer surface of the pipe to be monitored; a passageway in the probe insert, extending from an outlet at the top surface of the probe insert to an inlet in the upper wall of the chamber, such that the passageway is in flow communication with the chamber; a tube receivable through the outlet of the passageway; a plate removably connected to the housing for, securing the probe assembly in place; the plate comprising a biasing means for compressing the sealing means of the probe insert to engage the outer surface of the pipe to be monitored forming a substantially hermetic seal; and the tube when resting at the inlet of the probe insert extends through the plate.

According to another aspect of the present invention, there is provided a device for monitoring gas effusing from a pipe, the device comprising: a mounting assembly; a housing located on the mounting assembly; the bottom of the mounting is of a shape complementary to the pipe being monitored; a probe assembly; a bore in the housing for receiving the probe assembly; the probe assembly comprising: a probe insert; a chamber for collecting gas in the bottom of the probe insert formed by side walls and an upper wall; a compressible sealing means in the bottom of the side walls for sealingly engaging the outer surface of the pipe to be monitored; a passageway in the probe insert, extending from an outlet at the top surface of the probe insert to an inlet in the upper wall of the chamber, such that the passageway is in flow communication with the chamber; a tube receivable through the outlet of the passageway; a plate removably connected to the housing for, securing the probe assembly in place; the plate comprising a biasing means for compressing the sealing means of the probe disk to engage the outer surface of the pipe to be monitored forming a substantially hermetic seal; and the tube when resting at the inlet of the probe disk extends through the plate. In another aspect, the mounting assembly is welded to the pipe. In a further aspect, the mounting assembly is supported on the pipe by support means which can be, stand-offs.

According to a further aspect of the present invention, there is provided a method for monitoring gas effusing from a pipe comprising the steps of: providing a gas collection chamber and placing the chamber on a pipe being monitored such that a substantially hermetic seal is formed between the chamber and the pipe; providing a vacuum means connected to the chamber; evacuating the chamber; taking a measurement of the amount of a gas in the chamber after a period of time after evacuation of the chamber. In another aspect of the present invention, the gas being measured is hydrogen.

BRIEF DESCRIPTION OF THE DRAWINGS

The embodiments of the present invention are described below with reference to the accompanying drawings in which.

DETAILED DESCRIPTION OF AN EMBODIMENT OF THE TECHNOLOGY OF THE PRESENT APPLICATION

A device according to the present application measures the rate at which hydrogen effuses through a pipe as iron from the pipe is lost into solution as a consequence of corrosion. A probe having a pressure chamber (gas collection chamber) is sealed to the outside of a pipe. A vacuum is created within the chamber. Hydrogen effusing from the pipe through the wall of the pipe covered by the chamber is trapped by the chamber thus resulting in a rise in pressure inside the chamber. The rate of increase in pressure within the known volume of the chamber assembly is measured using a pressure sensor. The probe and attached tubing is preferably constructed of silver to minimize the diffusion of captured hydrogen out from the internal volume of the equipment.

The probe is housed within a housing mounted on a mechanical clamp and secured using bolts. The ridge of the silver probe is deformed against the pipe being monitored by the compressive force of the bolts, thus creating a vacuum seal and allowing measurements of hydrogen pressure to be taken by a pressure sensor.

Figure 1:
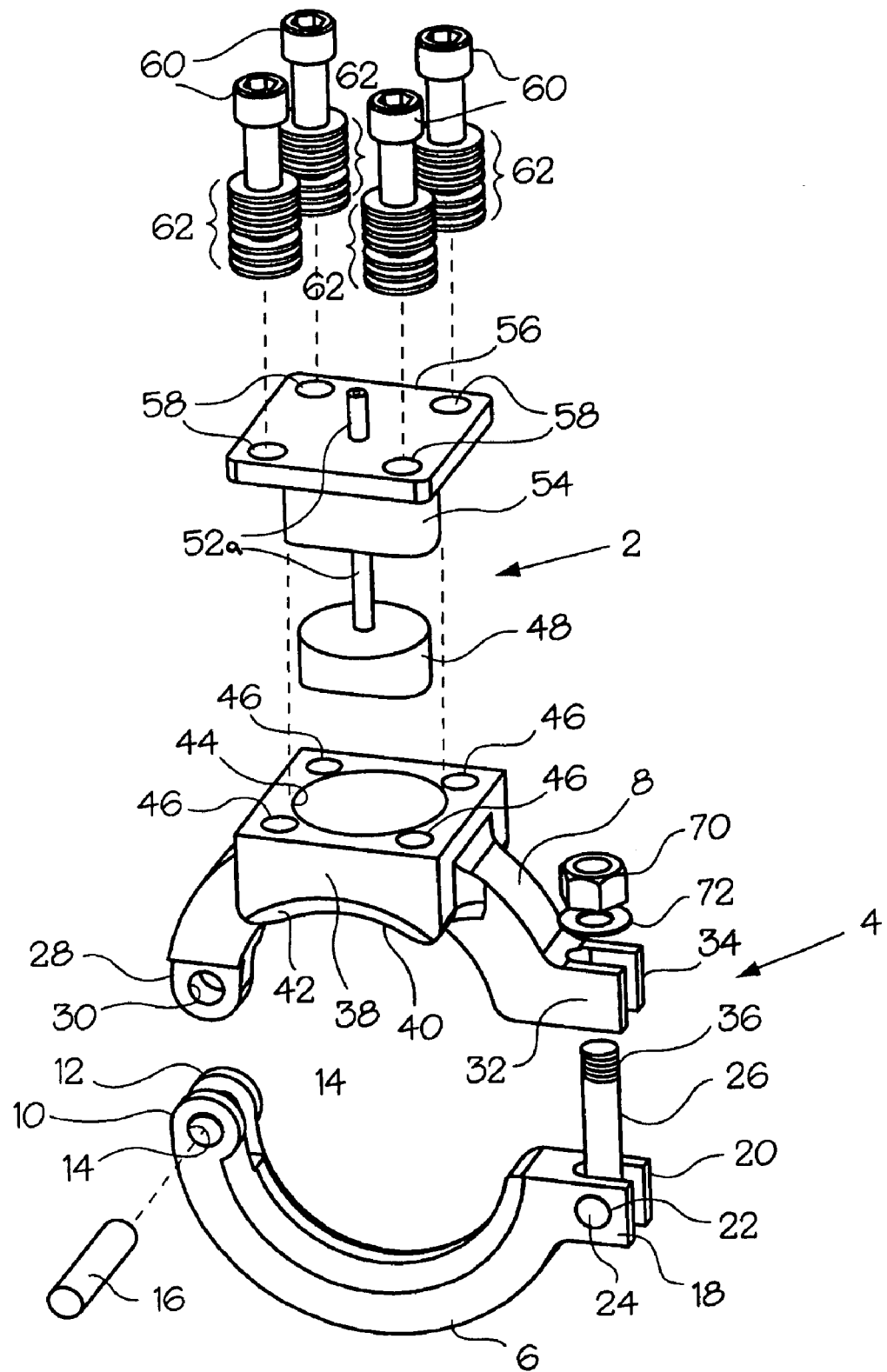
FIG. 1 is an exploded view of a device embodying the invention.

Referring to FIG. 1, a device according to the present application includes a hydrogen effusion probe ("HEP") assembly indicated generally at 2 that is mountable on a pipe by a clamp assembly indicated generally at 4. Clamp assembly 4 includes lower clamping bracket 6 and upper clamping bracket 8, although it will be understood that the use of upper and lower are for ease of reference only and does not require that the lower clamping bracket 6 necessarily be located below the upper clamping bracket 8 when the device is installed on a pipe.

Lower bracket 6 is horseshoe shaped for placement around a pipe to be monitored. A pair of, spaced apart, generally parallel flanges 10 and 12 are located at a first end of lower bracket 6.

Holes 14 are provided in flanges 10 and 12 for receiving a hinge pin 16 for pivotally attaching lower bracket 6 to upper bracket 8.

A second pair of spaced apart, of generally parallel flanges 18 and 20, are located at a second end of lower bracket 6. Holes 22 are provided in flanges 18 and 20 for receiving the pins 24 of a tee bolt 26.

The upper bracket 8 is also horseshoe shaped. A flange 28 is located at a first end of upper bracket 8. A hole 30 is provided in the flange 28 for receiving the pin 16.

A second pair of spaced apart, generally parallel flanges 32 and 34, are located at a second end of upper bracket 8 for receiving the threaded end 36 of tee bolt 26.

Housing 38 is located at the midsection of upper bracket 8. The bottom 40 of housing 38 is arcuate to conform to the outer surface of a pipe being monitored and includes a bevelled edge 42 and the same on the opposite edge (not shown). Central bore 44 through the housing 38 is provided for seating the HEP assembly 2 in the upper bracket 8. Four threaded bores 46 are provided in the housing 38 for receiving bolts for securing the HEP assembly 2 in the housing 38.

Figure 3:
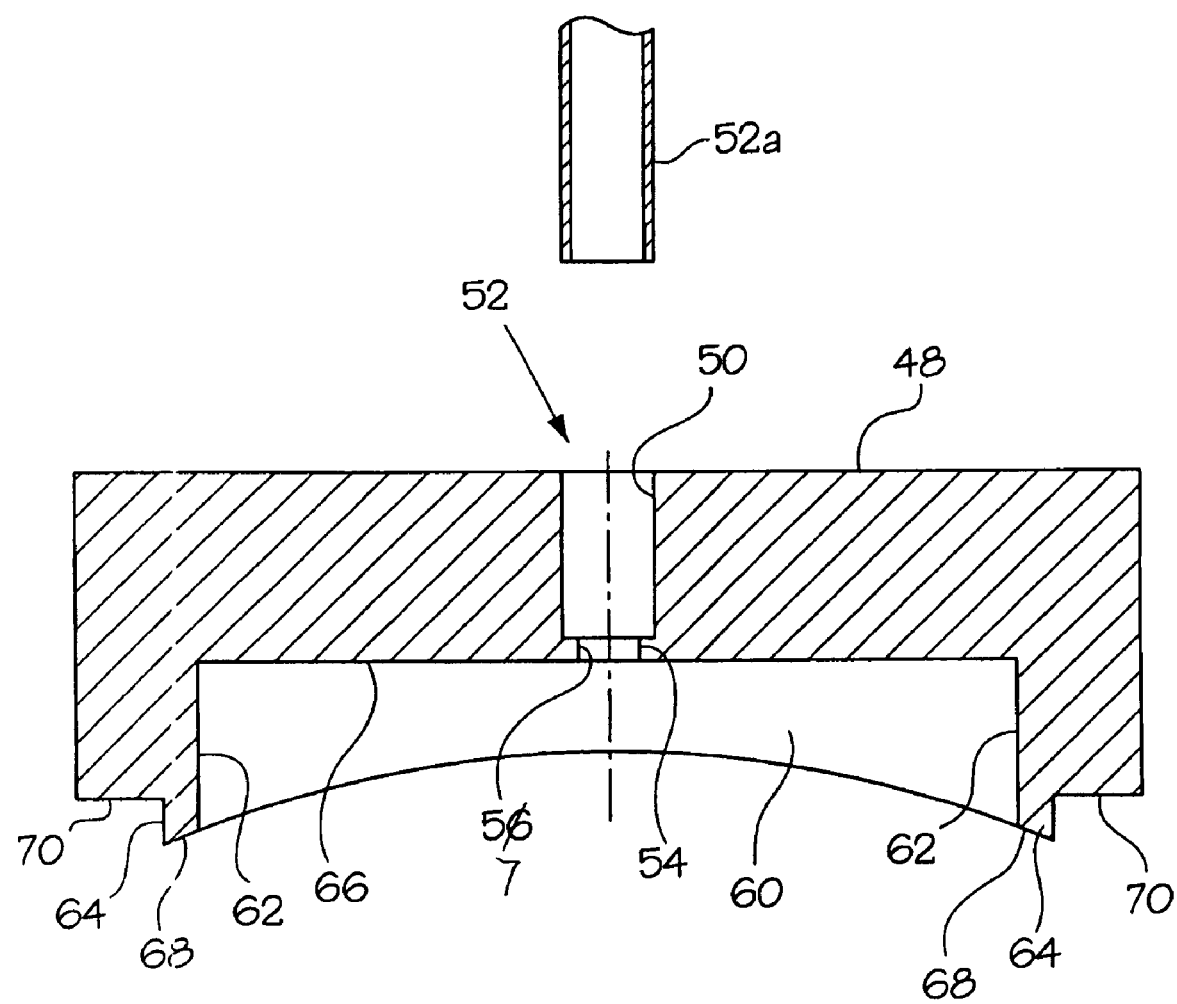
FIG. 3 is a cross-section of a section of the probe insert used in the device of FIG. 1.
Figure 7:
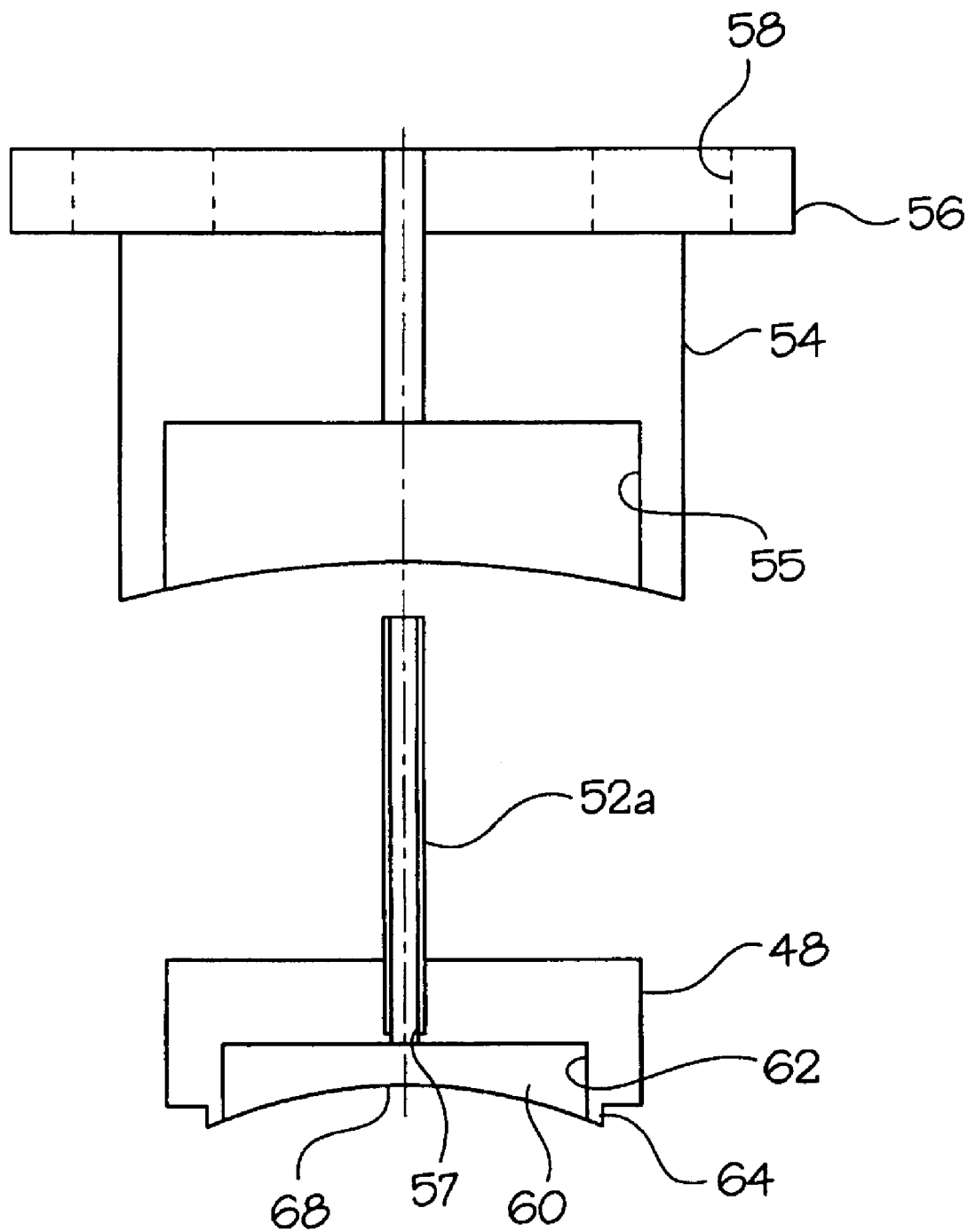
FIG. 7 is a cross-section exploded view of the probe insert and probe holder of the device of FIG. 1.

HEP assembly 2 includes a disk shaped probe insert 48 which functions as a hydrogen gas collection system. Referring to FIGS. 3 and 7, the probe insert 48 has a disk shaped body with a central passageway 50 having an outlet end indicated generally at 52. Passageway 50 narrows at seat 54 which defines inlet passageway 57 which connects passage way 50 to chamber 60. Chamber 60 is defined by annular sidewall 62 and an annular flange or ridge 64, and upper wall 66. The probe insert 48 nests in the cavity 55 of the spacer 54 when assembled.

The leading edge 68 of flange or ridge 64 is arcuate in cross section. The arc of the edge 68 corresponds to the outer circumference of the pipe being monitored.

Passageway 50 receives tube 52a. Probe insert 48 and tube 52a are preferably made of silver. Silver and gold exhibit a low hydrogen permeability including at higher temperature. Steels exhibit low hydrogen permeability at lower temperatures and are suitable for devices operating at lower temperatures. Tube 52a extends through probe holder (spacer) 54 and plate 56, preferably made of the same material as the pipe. Four holes 58 are provided in plate 56 for receiving screws or bolts 60 which together with compression washers 62, secure the HEP assembly 2 in housing 38. The compression washers 62 bias the probe insert 48 toward contact with the pipe being monitored, such that ridge 64 is compressed and edge 68 forms a substantially hermetic seal with the outer surface of the pipe.

Figure 2:
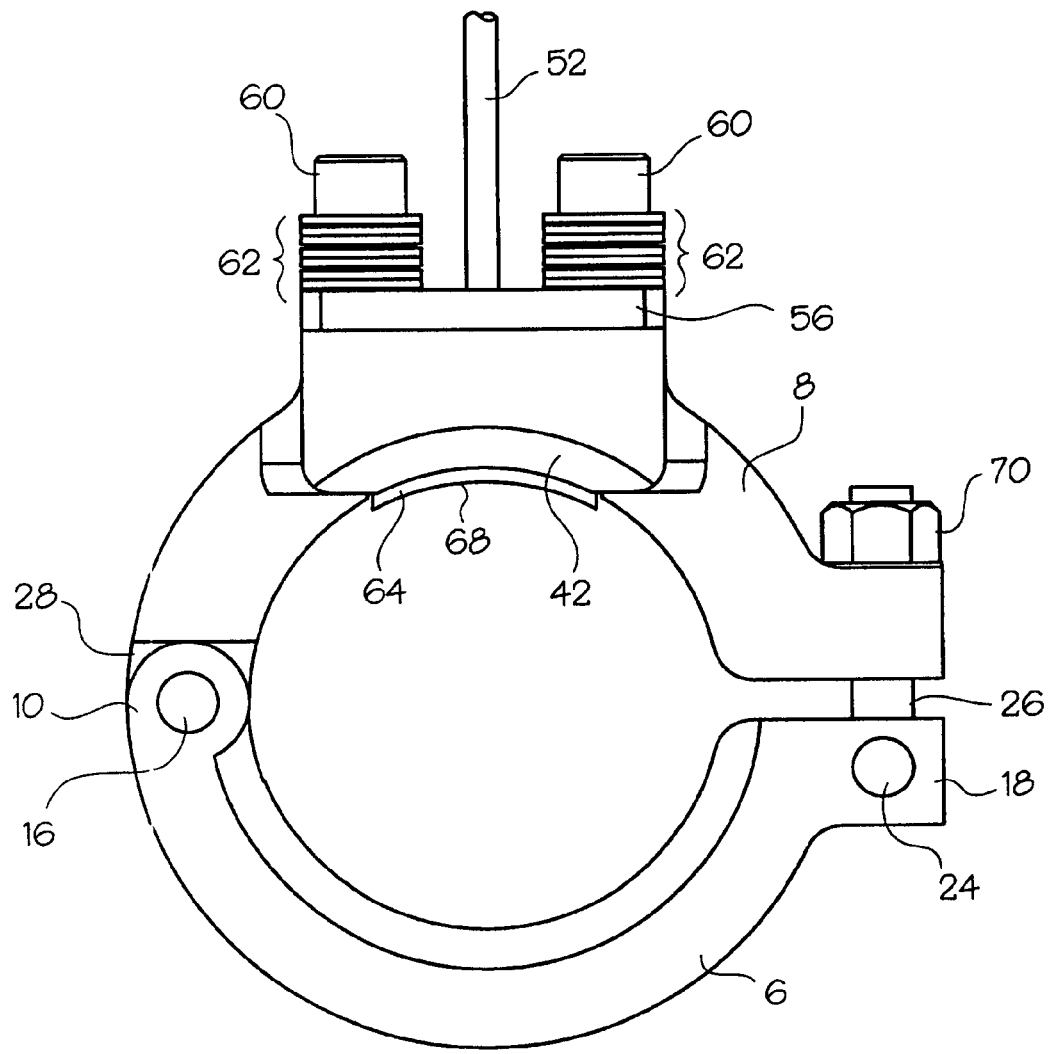
FIG. 2 is a front view of the device of FIG. 1 assembled.

Referring to FIG. 2, to install the HEP assembly 2 on a pipe, brackets 6 and 8 are pivotally connected to each other by placing the flange 28 of the upper bracket 8 between the flanges 10 and 12 of the lower bracket 6 and inserting the hinge pin 16 in holes 14 and 30. The brackets 6 and 8 are placed around a pipe and locked in place by passing tee bolt 26 between flanges 32 and 34 and locking the tee bolt 26 with nut 70 and washer 72.

When the brackets 6 and 8 are locked around a pipe, the probe insert 48, being spring biased, adjusts position within the housing 38 such that a substantially hermetic seal is formed with the pipe being monitored.

Figure 6:
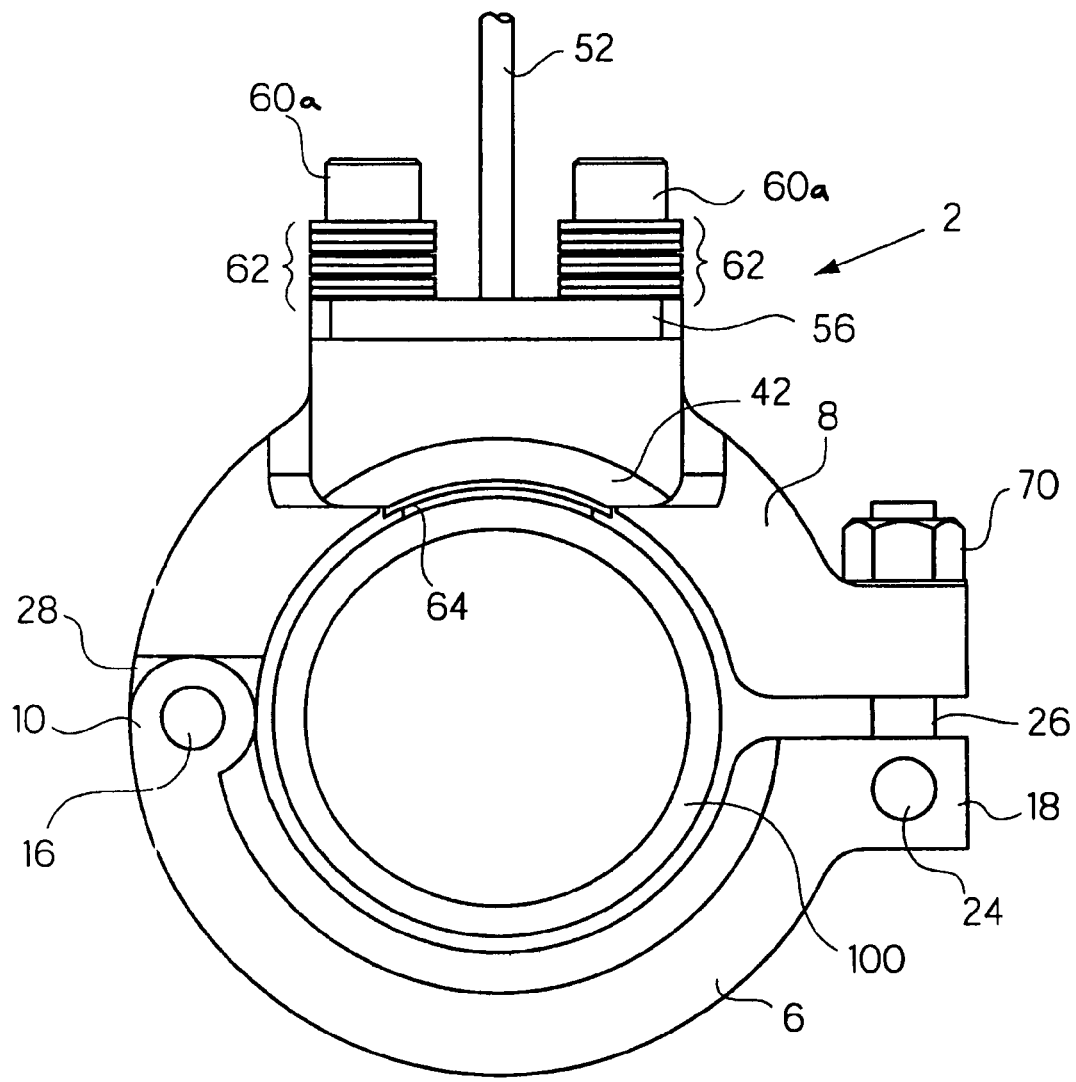
FIG. 6 is a front view of the device of FIG. 1 after installation on a pipe.

The substantially hermetic seal is possible through a compressible sealing means located at the bottom of the probe insert. In one embodiment of the technology, the sealing means comprises the ridge 64 made of malleable silver which is compressed when pressed against the outer surface of the pipe being monitored. The compression of the ridge 64 acts to mold the ridge to the outside of a being monitored (the pipe being made of a material that is harder than silver) the harder pipe thus forming a substantially hermetic seal. Referring to FIG. 6, the ridge 64 is shown in a compressed state against the pipe 100. The compression of the ridge 64 from a hermetic seal against the pipe.

The brackets 6 and 8 and housing 38 are preferably made of a material which has thermal expansion characteristics similar to the pipe being monitored. For example, if the pipe being monitored is made of A106 Grade B carbon steel ASME SA516 Grade 70 carbon steel can be used for the clamps.

Figure 4:
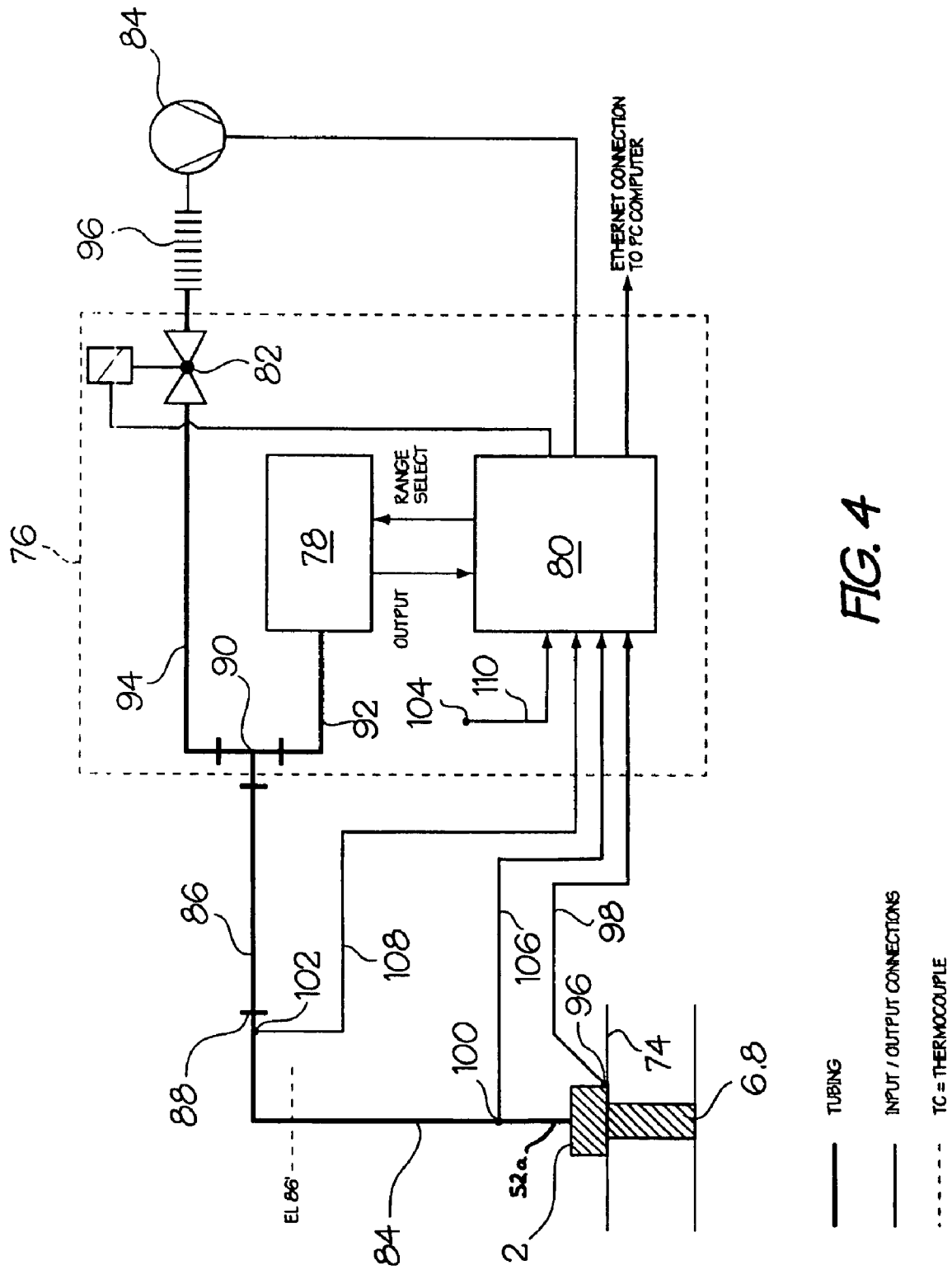
FIG. 4 is a process schematic of a system incorporating the device of FIG. 1.

Referring to FIG. 4, a system incorporating the HEP assembly 2 and brackets 6, 8 installed on feeder pipe 74 in a nuclear generating station includes a HEP instrumentation unit at 76 made by Hammond (Model IMEI668). The unit 76 houses absolute pressure transducer 78, a data acquisition and control unit 80 and isolation value 82 valve 82 is connect to vacuum pump 84 with tubing 96.

The vacuum pump 84 is a two-stage, oil sealed, sliding vane pump manufactured by Edwards (Model E2M1.5), pumps down to an ultimate vacuum of $7.5 \times 10^{-4}$ torr (0.0999 Pa). The vacuum pump 84 exhaust is vented to the exterior of the unit 76. This minimizes the possibility of hydrogen build up inside the unit 76.

The absolute pressure transducer 78 is used to measure gas pressure in the chamber 60. The transducer 78 is manufactured by MKS (Model MKS120AA-1000RCJ) and has an accuracy of +/−0.05% of reading over the full range of 0 to 1000 torr (133 kPa).

The isolation valve 82 is a "fail closed" electromagnetic valve (micro-EME part # 28444) manufactured by Leybold Vacuum. The valve body is low volume to minimize the overall volume of the system and has a leak rate of $1 \times 10^{-9}$ mbar L/s.

The data acquisition and control unit 80 is based on OPTO22 SNAP Ethernet I/O equipment. The control system operates in 2 modes: manual and cycle.

A silver tube 84, is connected to the tube 52a. Tube 84 runs from the HEP assembly 2 to stainless steel tube 86. Swagelock VCR fitting 88 couples tube 84 to tube 86. Tube 86 runs from fitting 88 to the unit 76 where it branches at junction 90 into tubes 92 and 94. Tube 92 runs to the transducer 78 while tube 94 runs to valve 82. Flexible tubing 96 connects valve 82 to vacuum pump 84. The valve 82, the HEP insert 48 and the tubing 52, 84, 86, 92, 94 and 96 form a closed system for collecting hydrogen during system operation. Thermocouple 96 is connected to the HEP 2 and by cable 98 to the control unit 80. Thermocouples 100 and 102 are connected to tubes 84 and 86 respectively, along with thermocouple 104 are connected to the control unit 80 by cables 106, 108 and 110 respectively The thermocouples 96, 100, 102 and 104 measure temperature at the locations at which they are installed.

In manual mode, the vacuum pump 84 and isolation valve 82 are turned on/open or off/closed at the user's discretion, usually during installation and testing.

In cycle mode, the data acquisition and control unit 80 controls the periodic venting of the system. The vacuum pump 84 is first turned on to evacuate the chamber 60 within the HEP insert 48. The valve 82 is then opened. The valve 82 is then closed after the specified assembly evacuation time is completed, to maintain the vacuum in the system. The vacuum pump 82 is then turned off and pressure is allowed to build as hydrogen effuses through the pipe and is collected in chamber 50 of the probe insert 48, to a predetermined pressure set point (eg. 2000 Pa absolute) or time set point (eg. 24 hours). The cycle is then repeated as necessary.

The data acquisition and control system collects data every 5 seconds, which can be retrieved and later analyzed offline. Data can be collected at other time intervals as required. The data acquisition and control voltage input module has an accuracy of +/−0.06% FS. The accuracy for this application (0 to 2000 Pa) is +/−0.2 Pa with the useable range of the I/O module selected to +/−5V and the transducer set on the 0.1× range.

Figure 5:
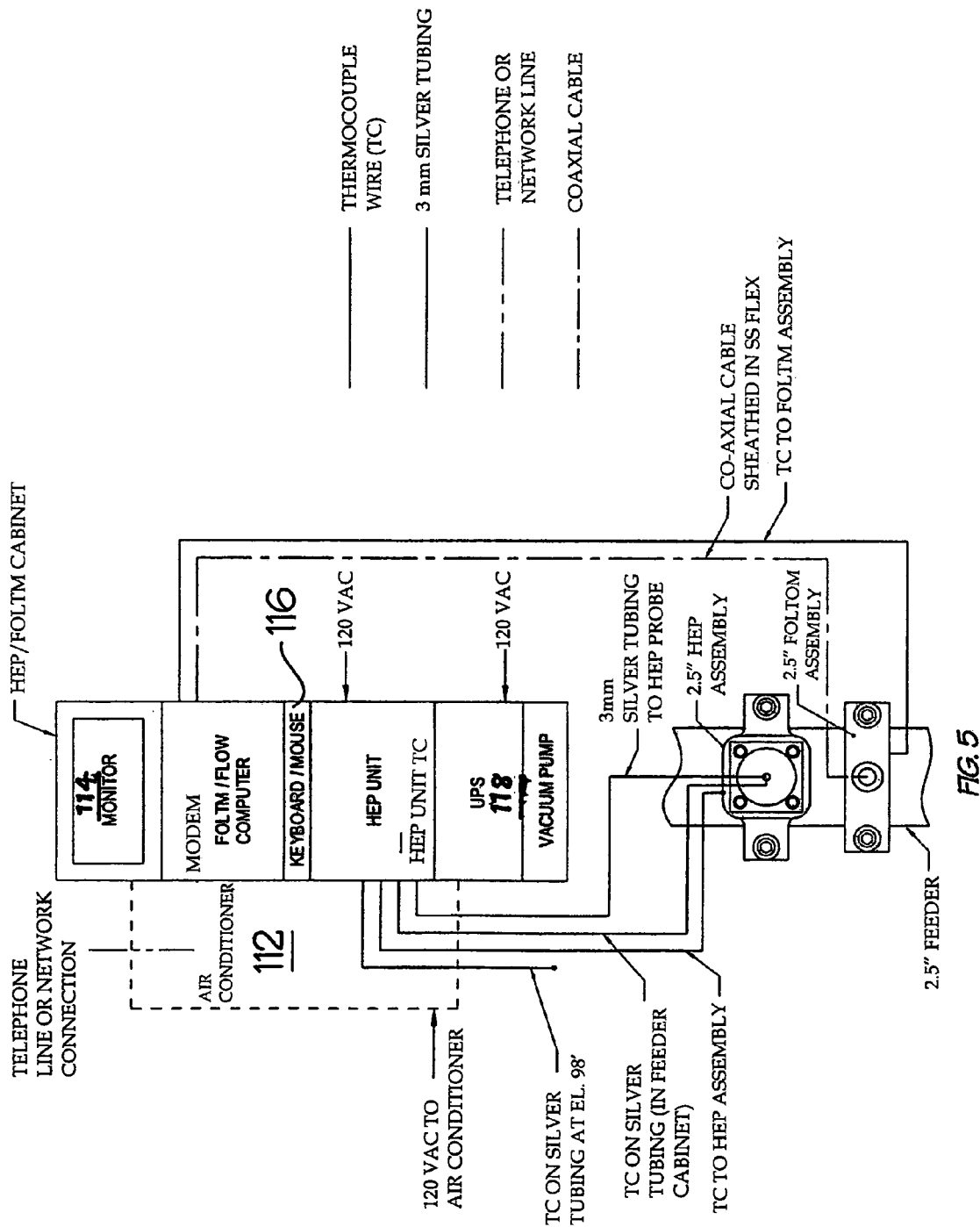
FIG. 5 is an instrumentation schematic of a system incorporating the device of FIG. 1.

The data acquisition system can further be supported by an air conditioner 112, monitor 114, keyboard and mouse 116, as well as an uninterrupted power supply ("UPS") 118 as shown in FIG. 5.

It will be understood by those skilled in the art that the operating parameters, such as temperature for the system described above are for the particular installation described but may need to be varied for monitoring of corrosion in other installations and if different equipment is substituted for any of the components of the system.

The rate of hydrogen effusion can be determined by known methods by measuring the change in pressure of hydrogen that accumulates in the chamber 60, as shown in FIG. 3. The pressure increase can be converted to a corrosion rate based on the surface area of the pipe undergoing corrosion in the HEP insert 48, the volume of the chamber 60, and the stoichiometry of the corrosion reactions. The data acquisition and control unit 80 can be programmed accordingly.

Figure 8:
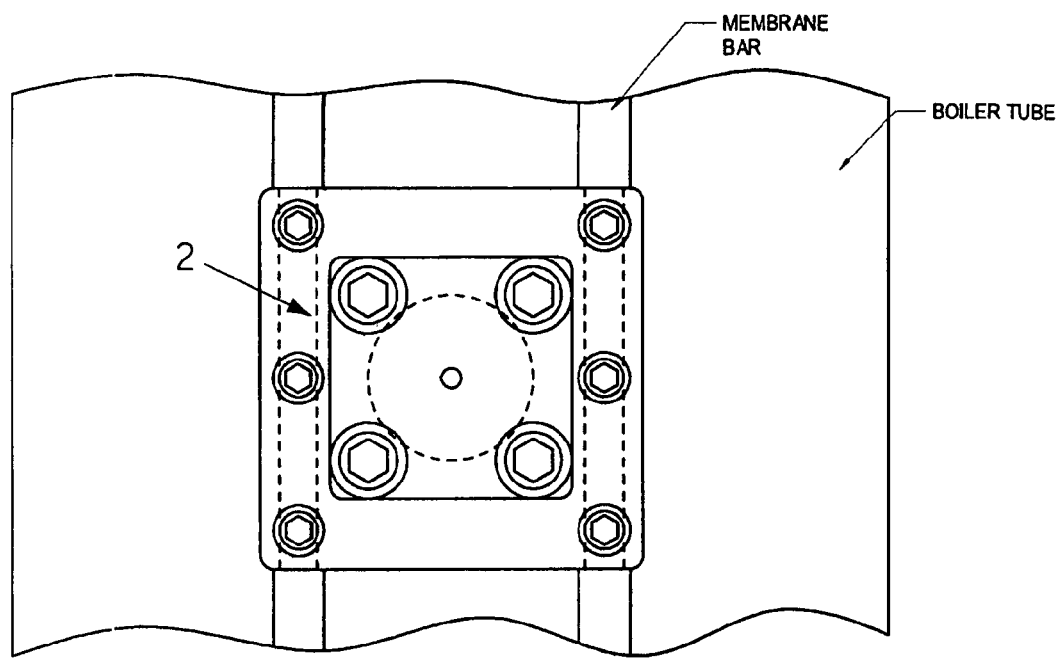
FIG. 8 is a top view of an alternative embodiment of the device of the present invention.
Figure 9:
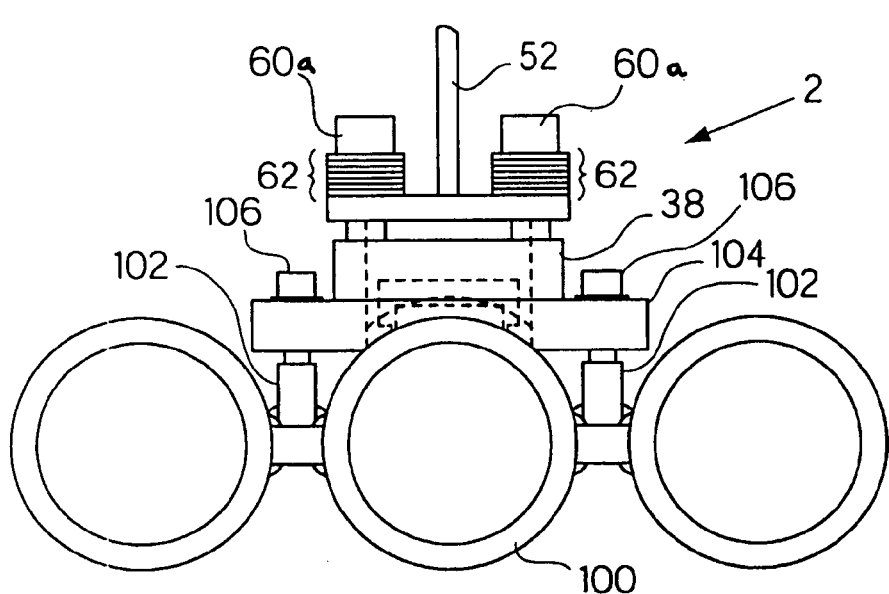
FIG. 9 is a side view of the device of FIG. 8.

FIGS. 8 and 9 illustrate an alternate embodiment of the present invention, wherein the HEP assembly 2 is welded to a pipe being monitored. This welded embodiment is used in applications where the clamp embodiment described above cannot be used to attach the HEP assembly 2 to a pipe, such as on a pipe which is part of the water-wall of a boiler. If the clamp can not be fitted around a pipe, then two stand-offs 102 are welded near the pipe, such as on either side of the pipe 100 to be monitored. The stand-offs 102 hold a plate 104 which receives the HEP assembly 2. The stand-offs 102 include bolts 106 which can be tightened to exert enough pressure to adequately deform the silver ridge 64. The housing 38 and probe insert are substantially similar to the clamp embodiment and sit on the plate 104 supported by the stand-offs 102.

I claim:

1. A device for monitoring gas effusing from a pipe, the device comprising:
    a mounting assembly having an upper and lower bracket;
    a housing located on the upper bracket;
    the bottom of the housing is of a shape complementary to the pipe being monitored;
    a probe assembly;
    a bore in the housing for receiving the probe assembly;
    the probe assembly comprising:
        a probe insert;
        a chamber for collecting gas in the bottom of the probe insert formed by side walls and an upper wall;
        a compressible sealing means in the bottom of the side walls for sealingly engaging the outer surface of the pipe to be monitored;
        a passageway in the probe insert, extending from an outlet at the top surface of the probe insert to an inlet in the upper wall of the chamber, such that the passageway is in flow communication with the chamber;
        a tube receivable through the outlet of the passageway;
        a plate removably connected to the housing for, securing the probe assembly in place;
        the plate comprising a biasing means for compressing the sealing means of the probe disk to engage the outer surface of the pipe to be monitored forming a substantially hermetic seal; and
        the tube when resting at the inlet of the probe disk extends through the plate.

2. The device according to claim 1 wherein the compressible sealing means is a, ridge whereby upon sufficient compression of the ridge against a pipe, a seal is formed.

3. The device according to claim 2 wherein the ridge is made from silver.

4. The device for monitoring according to claim 3 further including a vacuum pump and data acquisition and control systems in communication with the tube.

5. The device according to claim 4 wherein the gas being monitored is hydrogen.

6. The device according to claim 5 whereby, when the vacuum sealed chamber is evacuated the chamber of the probe assembly collects gas, increasing the pressure in the vacuum sealed chamber, and the changes in pressure indicate the amount of corrosion of the pipe being monitored.

7. A device for monitoring gas effusing from a pipe, the device comprising:
    a mounting assembly;
    a housing located on the mounting assembly;
    the bottom of the mounting is of a shape complementary to the pipe being monitored;
    a probe assembly;
    a bore in the housing for receiving the probe assembly;
    the probe assembly comprising:
        a probe insert;
        a chamber for collecting gas in the bottom of the probe insert formed by side walls and an upper wall;
        a compressible sealing means in the bottom of the side walls for sealingly engaging the outer surface of the pipe to be monitored;
        a passageway in the probe insert, extending from an outlet at the top surface of the probe insert to an inlet in the upper wall of the chamber, such that the passageway is in flow communication with the chamber;
        a tube receivable through the outlet of the passageway;
        a plate removably connected to the housing for, securing the probe assembly in place;
        the plate comprising a biasing means for compressing the sealing means of the probe disk to engage the outer surface of the pipe to be monitored forming a substantially hermetic seal; and
        the tube when resting at the inlet of the probe disk extends through the plate.

8. The device according to claim 7 wherein the mounting assembly is welded to the pipe.

9. The device according to claim 8 wherein the support means is a stand-off.

10. A method for monitoring gas effusing from a pipe comprising the steps of:
    providing a gas collection chamber and installing the chamber on a pipe being monitored such that a substantially hermetic seal is formed between the chamber and the pipe;
    providing a vacuum means connected to the chamber;
    evacuating the chamber;
    taking a measurement of the amount of a gas in the chamber a period of time after evacuation of the chamber.

11. The method according to claim 10 wherein the gas is hydrogen.

* * * * *